(12) United States Patent
Wedam et al.

(10) Patent No.: US 10,641,521 B2
(45) Date of Patent: May 5, 2020

(54) HEAT EXCHANGER

(71) Applicant: I.R.C.A. S.P.A. INDUSTRIA RESISTENZE CORAZZATE E AFFINI, San Vendemiano (IT)

(72) Inventors: Stefano Wedam, Mareno di Piave (IT); Federico Zoppas, Treviso (IT)

(73) Assignee: I.R.C.A. S.P.A. INDUSTRIA RESISTENZE CORAZZATE E AFFINI, San Vendemiano (IT)

( * ) Notice: Subject to any disclaimer, the term of this patent is extended or adjusted under 35 U.S.C. 154(b) by 458 days.

(21) Appl. No.: 15/329,674

(22) PCT Filed: Jul. 31, 2015

(86) PCT No.: PCT/IB2015/055811
§ 371 (c)(1),
(2) Date: Jan. 27, 2017

(87) PCT Pub. No.: WO2016/016857
PCT Pub. Date: Feb. 4, 2016

(65) Prior Publication Data
US 2017/0241665 A1    Aug. 24, 2017

(30) Foreign Application Priority Data

Jul. 31, 2014 (IT) .............................. RM2014A0437

(51) Int. Cl.
*F24H 1/10* (2006.01)
*F24H 1/12* (2006.01)
(Continued)

(52) U.S. Cl.
CPC ............ *F24H 1/102* (2013.01); *A47J 31/542* (2013.01); *B22D 17/24* (2013.01);
(Continued)

(58) Field of Classification Search
CPC .. A47J 31/057–0576; A47J 31/303–306; A47J 31/4435–4453; A47J 31/54–542;
(Continued)

(56) References Cited

U.S. PATENT DOCUMENTS 4,460,819 A * 7/1984 Eugster .................... F24H 1/142
                                                    392/467
4,861,969 A * 8/1989 Kicherer ............... F24C 15/102
                                                    219/451.1
(Continued)

FOREIGN PATENT DOCUMENTS

DE      7015875 U      1/1971
DE      2555599 A1     6/1977
(Continued)

OTHER PUBLICATIONS

International Search Report and Written Opinion, dated Nov. 11, 2015 for PCT Application No. PCT/IB2015/055811, filed Jul. 31, 2015.

(Continued)

*Primary Examiner* — Michael A Laflame, Jr.
(74) *Attorney, Agent, or Firm* — Abelman, Frayne & Schwab

(57) ABSTRACT

A device for heating a liquid includes a metal body, a conduit for the passage of the liquid to be heated, and one or more heating elements. The conduit and the one or more heating elements are incorporated in the body which forms a wall around the conduit and the one or more heating elements. Heat generated by the one or more heating elements is transmitted to the liquid to be heated by conduction. The body is provided with a plurality of openings which are separated from each other, having a depth equal to wall thickness. At least two first openings of the plurality of openings are on the conduit, and at least two second open- (Continued)

ings of the plurality of openings are on the one or more heating elements.

16 Claims, 6 Drawing Sheets

(51) Int. Cl.
  *F24H 1/14* (2006.01)
  *A47J 31/54* (2006.01)
  *B22D 19/00* (2006.01)
  *B22D 17/24* (2006.01)
  *H05B 3/44* (2006.01)
  *B22D 21/00* (2006.01)
  *B22D 29/00* (2006.01)
(52) U.S. Cl.
  CPC ....... *B22D 19/0072* (2013.01); *B22D 21/007* (2013.01); *B22D 29/001* (2013.01); *F24H 1/142* (2013.01); *H05B 3/44* (2013.01); *H05B 2203/014* (2013.01); *H05B 2203/021* (2013.01)
(58) Field of Classification Search
  CPC . H05B 3/60; H05B 3/68–72; F24H 1/10–106; F24H 1/12; F24H 1/14–142; F24H 1/16–162
  See application file for complete search history.

(56) References Cited

U.S. PATENT DOCUMENTS

| | | | | |
|---|---|---|---|---|
| 4,888,470 A | * | 12/1989 | Schreder | F24C 15/104 |
| | | | | 219/458.1 |
| 5,724,478 A | * | 3/1998 | Thweatt | F24H 1/142 |
| | | | | 219/535 |
| 7,801,424 B2 | * | 9/2010 | Cheung | A61H 33/063 |
| | | | | 392/385 |

FOREIGN PATENT DOCUMENTS

| | | |
|---|---|---|
| DE | 2903743 A1 | 8/1980 |
| DE | 8529085 U1 | 11/1985 |
| DE | 8605223 U1 | 4/1986 |
| DE | 4212074 C1 | 4/1993 |
| DE | 4226325 C1 | 9/1993 |
| DE | 102011007542 A1 | 10/2012 |
| GB | 2079421 A | 1/1982 |

OTHER PUBLICATIONS

International Preliminary Report on Patenability, dated Jul. 26, 2016 for PCT Application No. PCT/IB2015/055811, filed Jul. 31, 2015.

* cited by examiner

НEAT EXCHANGER

CROSS REFERENCE TO RELATED APPLICATION

This application claims benefit under 35 U.S.C. § 371 to international application No. PCT/IB2015/055811, filed on Jul. 31, 2015, which claims priority to Italian application no. RM2014A000437, flied Jul. 31, 2014, the contents of which are incorporated by reference in their entireties.

FIELD OF THE INVENTION

The present invention relates to a device for the exchange of heat between an electrical resistor and a fluid flowing within a conduit.

BACKGROUND OF THE INVENTION

The devices for heating a continuous flow fluid essentially consist of two components, a heating component consisting of one or more electrical resistors in thermal contact with the other component, essentially a conduit, or pipe, in which a liquid to be heated flows. These devices are used in automatic machines for coffee, tea, or more in general for hot drinks. In these machines the water must be brought to a certain temperature, for example approximately 90-100° C. for the preparation of coffee or 120-140° C. for the production of steam. The characteristic of these heat exchanger machines relates to the flow of the water that continuously flows along the pipe and that must therefore be brought to the right temperature in the short period of time passing between the entry of the water into the device and its exit from the device itself. This demands that the device must be able to provide a sufficient amount of heat to heat the water in this short period of time. These are therefore devices that must have a low thermal inertia, also to allow the passage from one function to another, such as, for example, from the water heating function to the steam generation function, in the shortest possible time. It is therefore necessary, in order to avoid having to resort to relatively long pipes, to provide systems in which the exchange of heat between the heating element and the water is particularly efficient. There are currently particularly efficient systems on the market called "flow through heater" (FTH) that typically consist of an extruded aluminium body with three through-holes. A pipe, for the most part made of steel, that is subsequently brazed, is inserted into the central hole, while the heating resistors are formed in the two side holes. FIG. 1 shows a device 100 of this type. The device represented in FIG. 1 consists, as mentioned, of an aluminium extrusion 1 wherein two heating resistors 2 and a steel pipe 3, where the water to be heated can flow, are formed.

Document DE8529085 describes a heating device having a body with an upper and lower face opposite to each other. Two respective continuous longitudinal grooves that primarily extend along the longitudinal axis of the heating elements are laterally present between the two faces, so as to leave a long portion thereof uncovered and not in contact with the body. The heater described in this document proposes to solve the problems linked to calcification and corrosion of the pipe for the fluid by coating the latter with a layer of plastic.

The problems that arise in the production of this type of device, in particular those of the flow through heater type, mainly relate to the high production waste in the brazing step and to functional repeatability. In addition, the brazing process used to join the steel pipe and the aluminium body together does not ensure 100% joining of the coupled surfaces of the two components.

In an embodiment thereof, document DE2555599 describes a heating device with a body and provided with a channel and a heating element. The heating element is provided with a plurality of peripheral projections that primarily extend along its longitudinal axis in order to anchor the heating element to the body. Moreover, in this case also, the body has an upper face and a lower face that are opposite to each other, between which a continuous longitudinal groove is laterally present at the heating element, which primarily extends along the longitudinal axis of the latter. Since this groove is present, one of the projections of the heating element is not covered by and is not in contact with the body. One disadvantage of the configurations of the above documents is indeed provided by the fact that a long portion of heating element is not in contact with the body, due to the long continuous longitudinal grooves that are laterally present. The exchange of heat between the heating element and the body, and thus with the fluid to be heated, is therefore substantially reduced. In addition, producing heating elements with longitudinal projections is relatively complex and expensive.

A further problem of the devices produced by extrusion relates to the difficulty of integrating the thermostat-holder platforms and the control sensor platforms that must be produced by the joining thereof to the aluminium body by welding and/or brazing, the problem of contact uniformity thus remaining. Another construction method used is the one that uses a low pressure aluminium or alloy die-casting process, which however has the disadvantage of being slow and therefore unprofitable for large production numbers. There is therefore a need to produce a new type of device for heating a continuous flow fluid that can overcome the described defects, is compact and has a high heat exchange efficiency, while also improving the speed of the production process.

SUMMARY OF THE INVENTION

One aim of the present invention is to provide a device for heating a continuous flow fluid that improves the heat exchange between the resistors and the fluid flowing inside a conduit by means of the perfect joining of the various components, which is not currently guaranteed by braze welding.

Another aim of the present invention is to improve the efficiency of the production process with respect to low pressure die casting, and eliminating the critical brazing process.

These and other aims, which will subsequently become evident, are achieved by means of a device for heating a liquid, in particular water, which, according to an embodiment, comprises:
  a metal body,
  a conduit, for the passage of the liquid to be heated,
  a single heating element, shaped so as to have two
    longitudinal stretches that longitudinally flank the conduit along two sides or
  two heating elements that longitudinally flank the conduit along two sides,
  wherein the conduit and the single heating element or the two heating elements are incorporated in the body that forms a wall around the conduit and the single heating element or the two heating elements, whereby the heat generated by the single heating element or by the two heating elements can be transmitted to the liquid to be heated by means of conduction, and wherein the body is provided with a plurality of slits or holes having a depth equal to the thickness of the wall, of which at least a first slit of said plurality of slits is on the conduit and at least a second slit of said plurality of slits is on each stretch of the single heating element, or at least a second slit of said plurality of slits is on each of the two heating elements.

In the present context, the axis of the conduit, like that of the stretches of the single heating element and of the two heating elements, can be a straight axis, a curved axis or an axis that can have both one or more straight stretches and one or more curved stretches.

In a first embodiment of the invention, a single heating element having two straight stretches, or branches, longitudinally flank a straight conduit along two sides, is provided. The two stretches are joined by a portion of heating element that curves around the end of the conduit.

In a second embodiment of the present invention, two distinct, straight heating elements that longitudinally flank a straight conduit along two sides, are provided.

In a third embodiment of the invention, the conduit and the two stretches of the single heating element or the conduit and the two heating elements have at least one curved stretch. Each curved stretch is preferably arranged about halfway between two respective straight end stretches.

The single heating element or the two heating elements are preferably sheathed electrical resistors.

The conduit and the single heating element are preferably distinct elements from each other and distinct from the body. When there are two heating elements, it is preferable for the two heating elements, the conduit and the body to be distinct elements from each other.

The slits are preferably distinct and axially separated from each other.

Advantageously, each slit acts as a section divider or interruption. In fact, thanks to the slits, or imprints or holes, it is possible to compensate for the different expansions, particularly but not exclusively in the longitudinal direction, between the various components. For example, between the body and the conduit, and between the body and the heating element/s, which being made of different materials have different thermal expansion values. Without the slits provided in the invention, these expansions could cause undesired detachment between the contact surfaces of the components. The slits are particularly advantageous when relatively long straight stretches of the conduit and resistors are present. In addition, the slits are particularly advantageous when they prevalently extend in the transverse direction, for example perpendicular, with respect to the major axis of the conduit and of the heating elements, although other orientations and forms of the slits are also possible. A further advantage is provided by the fact that the slits of the invention preferably have a much smaller size than the body of the heating device, so as to limit heat losses as much as possible.

The body of the heating device typically comprises two faces, which for only descriptive purposes can be respectively defined upper and lower, that are substantially opposite to each other. The upper and the lower face are laterally joined together by a respective side edge. It is particularly preferred that the slits be at least partially or exclusively obtained at the upper and/or lower face.

According to the invention, a plurality of slits or holes, of which at least one at the conduit and at least one at each stretch of the single heating element or at each of the two distinct heating elements, are provided. In other words, at least three slits or holes are provided. The advantage that arises from providing at least three slits can be fully understood by considering that the slits are also a consequence of the projections used in the production process of the device, which will be described below. The projections are used as support for the conduit, and for the stretches of the single heating element or for the two heating elements, and an optimal support will be achieved when at least three projections are provided, from which at least three respective slits arise, i.e. for the conduit and each stretch or for the conduit and each heating element. It is similarly explained why it is preferable for the slits to be provided at the upper face and/or at the lower face of the device. Once again for the same aim, to provide an optimal support, it is particularly advantageous when the conduit is provided with at least two slits, and when each heating element, or each branch or stretch of a single folded heating element, are provided with at least two slits.

In a particularly preferred, but non-exclusive manner, the slits are arranged substantially transversely with respect to the axis of the conduit and to the axis of at least one portion of the at least one heating element.

Advantageously, the conduit is made of steel, or aluminium alloys thereof, with a thin wall, preferably having a thickness of less than or about 1 mm. This arrangement allows an optimal heat exchange between the at least one heating element and the conduit, thus obtaining rapid heating of the fluid.

The cross-section of the conduit, viewed on a plane that is perpendicular to the axis of the conduit, can be substantially circular or substantially dog-bone shaped, at least for portions of its length. However, the shape of the cross-section of the conduit can be of any type.

The body is preferably provided with at least one platform that is integral thereto, adapted to fix a thermostat and/or to provide areas for detecting the temperature by means of sensor.

In the device for heating a continuous flow fluid according to the invention, the at least one heating element can be a single sheathed resistor, equipped with two straight stretches or branches that run parallel to the conduit; alternatively, two heating elements are provided, which can be two distinct straight sheathed resistors that run parallel to the conduit.

It is also preferable that the at least one heating element is substantially smooth, i.e. does not have projections on its outer surface.

According to another aspect, the invention provides a process for producing a device for heating a fluid, wherein the conduit has two open ends, and wherein there are provided a mould having the outer shape of the body; at least one metal core having a cross-section substantially equal to the conduit section, adapted to be inserted into the conduit; an injection device; and a plurality of projections on the inner surface of the mould, each projection being adapted to shape a respective slit of said plurality of slits, said process comprising the steps of:
arranging said conduit and said stretches of the single heating element or of said two heating elements on a respective projection of said plurality of projections,
closing the mould,
inserting the at least one metal core into a respective end of the conduit, filling the mould by means of high-pressure injection of molten metal so that the conduit deforms reproducing the shape of said at least one metal core, cooling the metal, extracting said at least one metal core from the conduit, opening the mould, extracting the device.

The molten metal preferably is aluminium or alloys thereof

A further benefit of the die-cast solution is the integration of the thermostat-holder platforms and of the platforms for the control sensors, that can be directly obtained from the aluminium casting by suitably shaping the mould.

The die-casting or pressure die-casting process, performed under high pressure, and also achievable under vacuum both in a hot and cold chamber, rather than the low pressure die-casting or gravity casting processes, which are slower, is well suited for the reduced process times required for the mass production of such a product. Additionally, it is possible to guarantee the joining of the steel conduit and the conductive aluminium body for the entire contact area thanks to the die-casting process, and the same objective is reached for the thermal contact of the resistors and the body. Thermostat-holder platforms and sensor control platforms, that can be directly obtained from the aluminium casting by suitably shaping the mould, can be formed along the aluminium alloy body of the device.

The continuous flow heater produced by means of high-pressure die casting according to the invention, allows the following benefits to be obtained among others:

improve heat transmission between the at least one resistor and the fluid;

improve heat homogeneity along the entire length of the steel conduit, given that perfect joining of the various components is ensured;

improve productivity through the die casting process that is much quicker and more efficient with respect to normal low-pressure casting procedure or gravity casting of the brazing process.

improve the heat control accuracy of the device and safety intervention accuracy in the event of a malfunction, since the sensor support platforms are obtained directly in the aluminium alloy body thus ensuring the perfect joining of the various sensors and the body.

In die casting, the molten metal is injected into a metal mould at high pressure. The necessary operating pressure for injecting the metal to be cast is generally quite high and can range from 20 to 1500 bar, if both hot chamber and cold chamber die casting processes are considered. The aluminium and aluminium alloys are processed in a cold chamber with pressures between 100 and 1500 bar. The pressure can be maintained for the entire duration of the die casting process, until the product solidifies.

The use of the device of the invention is also provided for a machine for domestic use for heating water for beverages, for example, but not exclusively adapted for the preparation of coffee, tea and/or the generating of steam.

The dependent claims describe preferred embodiments of the invention.

BRIEF DESCRIPTION OF THE DRAWINGS

Further features and advantages of the invention will become more evident in the light of a detailed description of preferred, but non-exclusive, embodiments illustrated by way of a non-limiting example, with the assistance of the accompanying drawings, in which.

The drawings are only provided by way of a non-limiting example. The same numbers and the same reference letters in the drawings identify the same elements or components.

DETAILED DESCRIPTION OF PREFERRED EMBODIMENTS OF THE INVENTION

Figure 1:
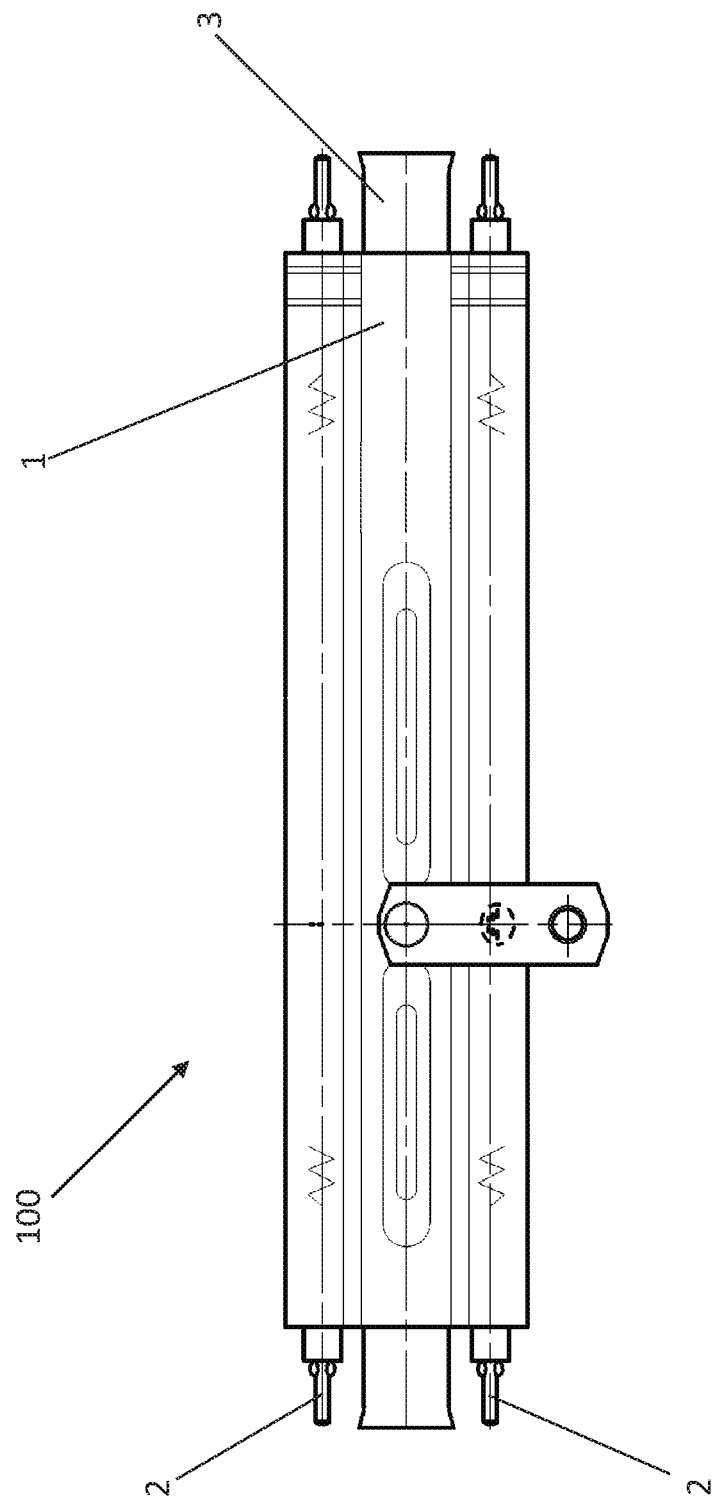
FIG. 1 represents a perspective view of a device of the state of the art for heating a continuous flow fluid.
Figure 2:
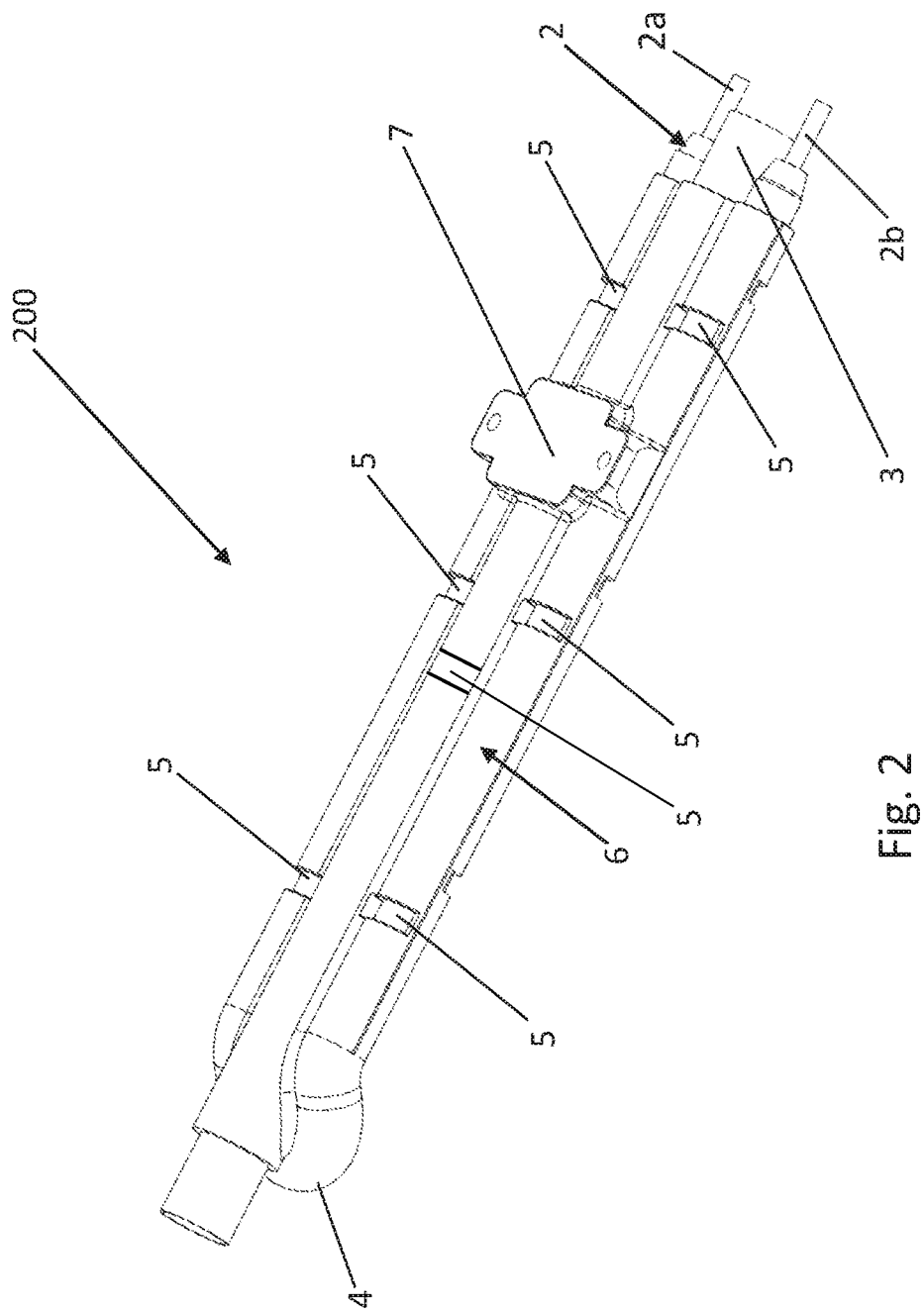
FIG. 2 represents a perspective view of a device for heating a continuous flow fluid according to a first embodiment of the invention.

FIG. 2 shows a device 200, according to the invention, for heating a continuous flow fluid, preferably a liquid, produced by die-casting, and thus at a higher pressure with respect to the low pressure of the standard casting process, generally less than 5 bar. The device 200 comprises a body 6, made of die-cast aluminium or alloys thereof. The device also comprises a conduit 3 for the liquid. A heating element 2, equipped with two straight stretches or branches 2a, 2b is provided for heating the liquid, and in the present embodiment this is a single sheathed electrical resistor 2, preferably made of standard copper-plated iron, folded at about half of its length, so as to have two stretches, or branches 2a, 2b that are substantially parallel and equidistant from the conduit 3 of the fluid.

The two branches 2a and 2b are connected by a central portion of the sheathed electrical resistor 2 that folds back on itself turning around one end of the conduit 3 of the fluid. The central folded portion of the resistor 2 is arranged in the area of the body 6 that is indicated with reference 4. Conduit 3 of the fluid and electrical resistor 2 are incorporated into the conductive metal body 6, made of aluminium or an aluminium alloy, obtained by means of a high pressure die-casting process (or pressure die-casting) process. The body 6 is also provided with a plurality of slits 5, or imprints or holes, preferably substantially transversal to the longitudinal axis of the conduit 3, both at the conduit 3 and at the straight branches 2a, 2b of the electrical resistor 2. As can be seen, the slits are provided at a face of the device having the greatest extension, for example the upper face Three slits are provided for each branch 2a, 2b and one slit for the conduit 3. However, in general, there can be a different number of slits. For example, at least one slit, for example, two or more slits, can be provided at each branch and at least one slit, for example two or more slits, can be provided at the conduit. At each slit 5, depending on the position thereof, surface portions of the conduit 3 or of electrical resistor 2 are exposed. In this embodiment, the slits 5 have a substantially semi-circular cross-section, seen in a plane that is perpendicular to the axis of the conduit 3 and primarily have the advantageous function of section divider. It is in fact possible, thanks to the slits 5, to compensate for the different expansions, particularly in the longitudinal direction, between the various components, in particular between the body 6 and the conduit 3, and between the body 6 and the electrical resistor 2, which, being made of different materials, have different thermal expansion values. These expansions could cause undesired detachment between the contact surfaces of the components. It is evident that the slits can have a different shape and orientation to the one described. The device is also provided with a platform 7 for supporting one or more sensors and/or one or more thermostats. It is evident that more than one platform can also be provided.

Figure 3:
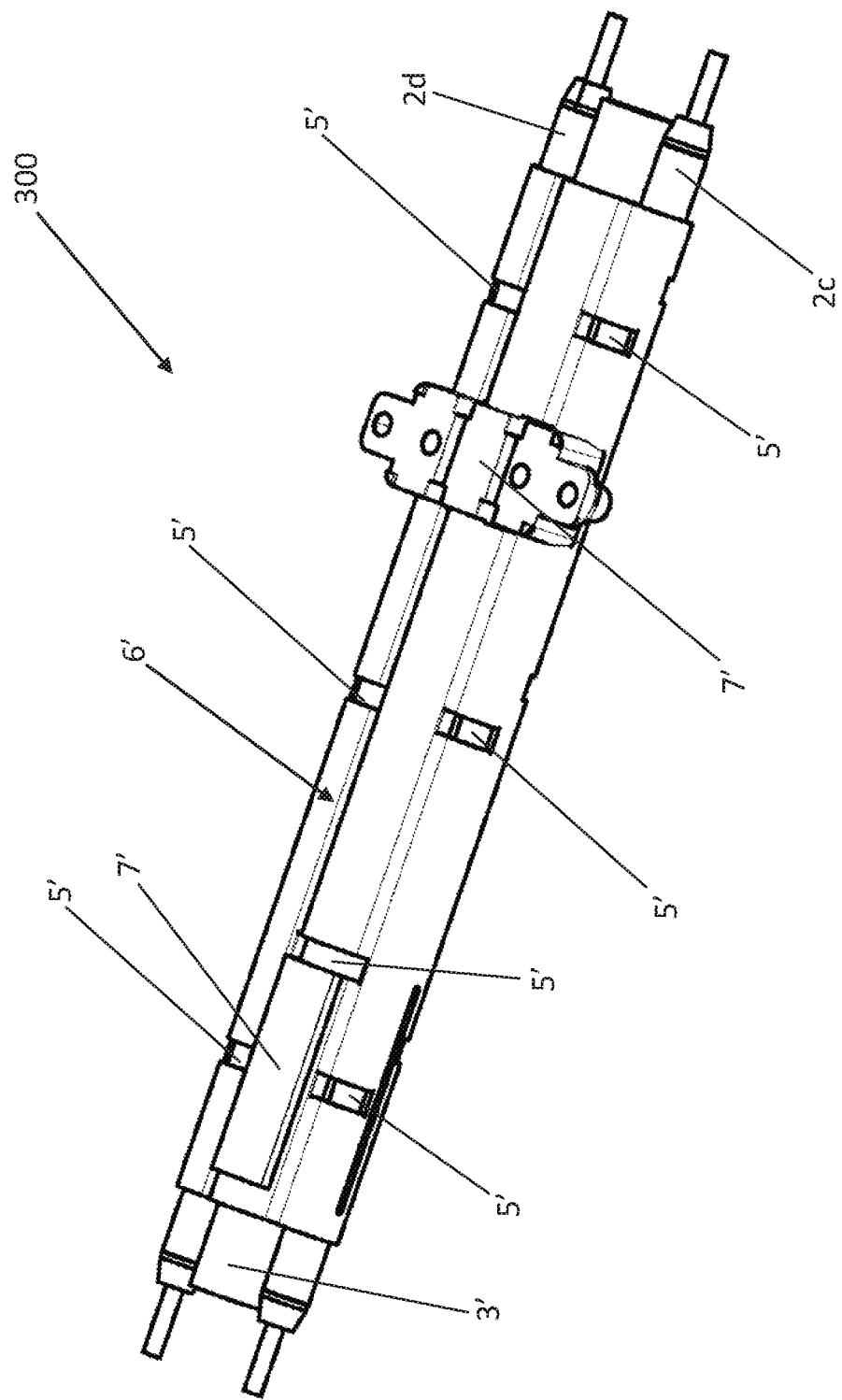
FIG. 3 represents a perspective view of a device for heating a continuous flow fluid according to a second embodiment of the invention.

FIG. 3 represents another embodiment of a device 300 for heating continuous flow fluids, provided with two heating elements 2c, 2d, which are two distinct sheathed electrical resistors that run parallel to the conduit 3' of the fluid and that are equidistant therefrom according to a line that transversally passes to the longitudinal axis of the conduit 3'. The conduit 3' of the fluid and the electrical resistors 2c, 2d are characterised by long straight stretches; for this reason in particular, it is therefore important that the aluminium body 6' be provided with slits 5', or imprints or holes, preferably substantially transversal to the longitudinal axis of the conduit 3'. Each slit 5' has the function of section divider, as previously described. As can be seen, the slits are provided at a face of the device having the greatest extension, for example the upper face. FIG. 3 illustrates the slits 5' at the conduit 3' and the electrical resistors 2c, 2d, which have a substantially semi-circular cross-section, seen in a plane that is perpendicular to the axis of the conduit 3', although the slits can also have a different shape and orientation from the one described. Furthermore, according to this embodiment, three slits for each electrical resistor 2c, 2d and one slit for the conduit 3 are provided. However, in general, the number of slits can be different. For example, at least one slit, for example, two or more slits, can be provided at each resistor, and at least one slit, for example two or more slits, can be provided at the conduit. In this case also, a platform 7' for supporting one or more sensors and/or one or more thermostats is provided, it being understood that more than one platform can be provided.

Figure 4:
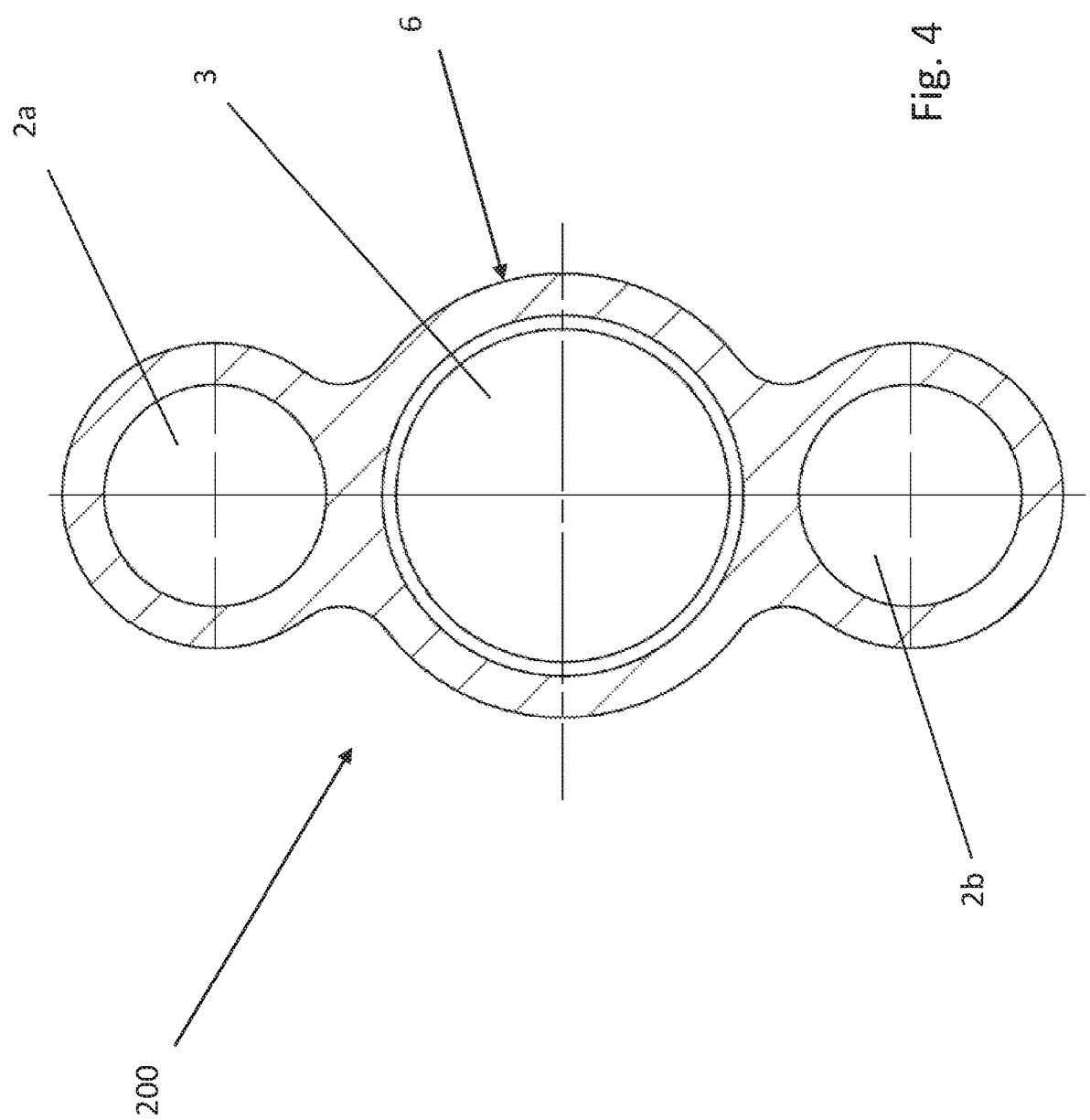
FIG. 4 represents a cross-sectional view, on a plane that is perpendicular to the longitudinal axis of a conduit for the fluid according to the present invention, for example, but not exclusively, of the device of FIG. 2.
Figure 5:
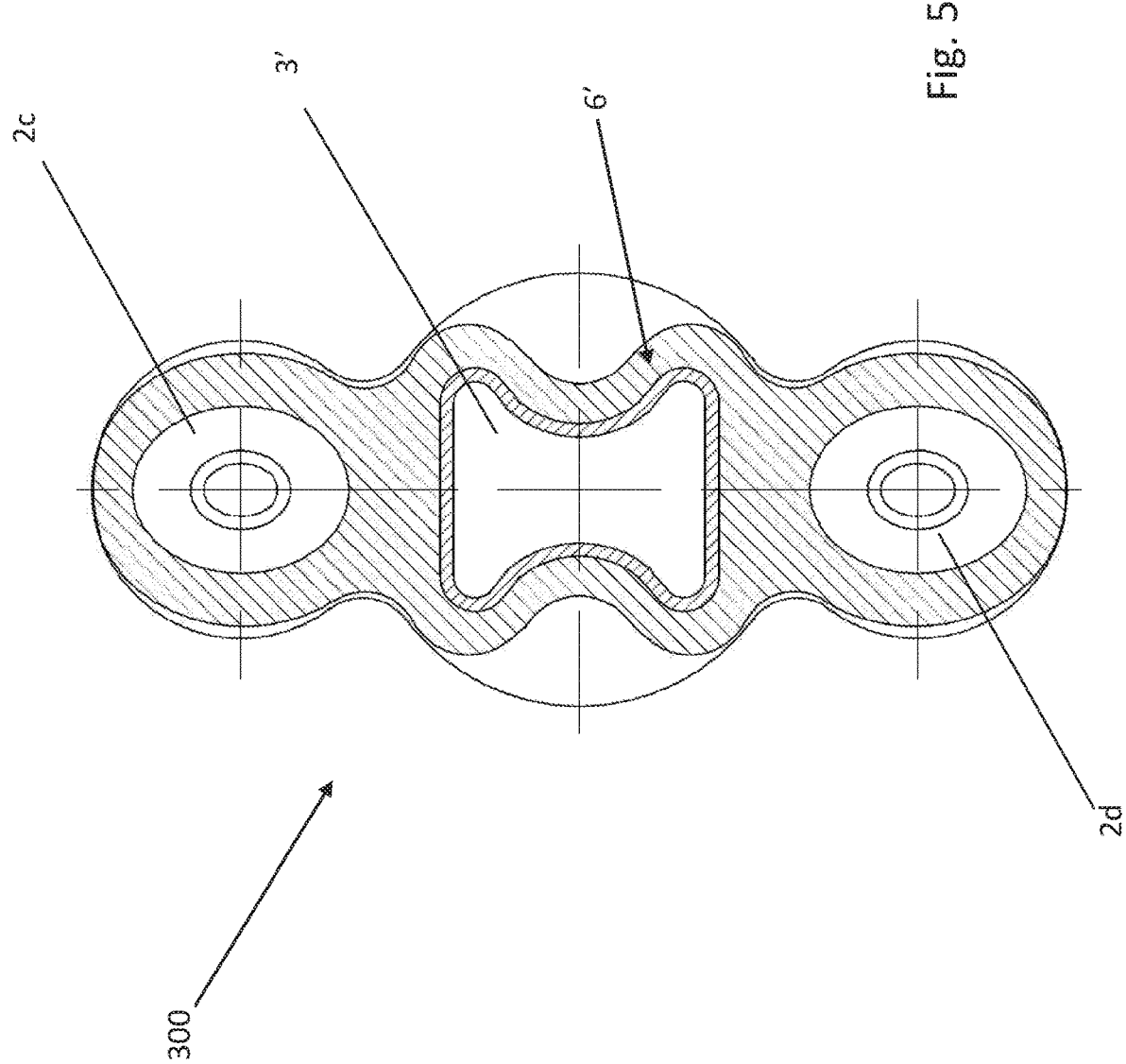
FIG. 5 represents a cross-sectional view, on a plane that is perpendicular to the longitudinal axis of a conduit for the fluid according to the present invention, for example, but not exclusively, of the device of FIG. 3.

FIG. 4 and FIG. 5 represent two different exemplary embodiments of the conduit 3, 3' of the fluid, that the device of the invention can have.

FIG. 4 represents a device according to the invention, wherein the conduit 3 (or 3' or 3") of the fluid has a perpendicular cross-section that is circular.

FIG. 5, on the other hand, relates to a conduit 3' (or 3 or 3") of the fluid, having a shaped section, for at least some portions of its length, this term being intended to mean the possibility of obtaining conduits having different shapes depending on use or requirements. In the illustrated embodiment, the section of the conduit 3' is for example, substantially dog-bone shaped.

Figure 6:
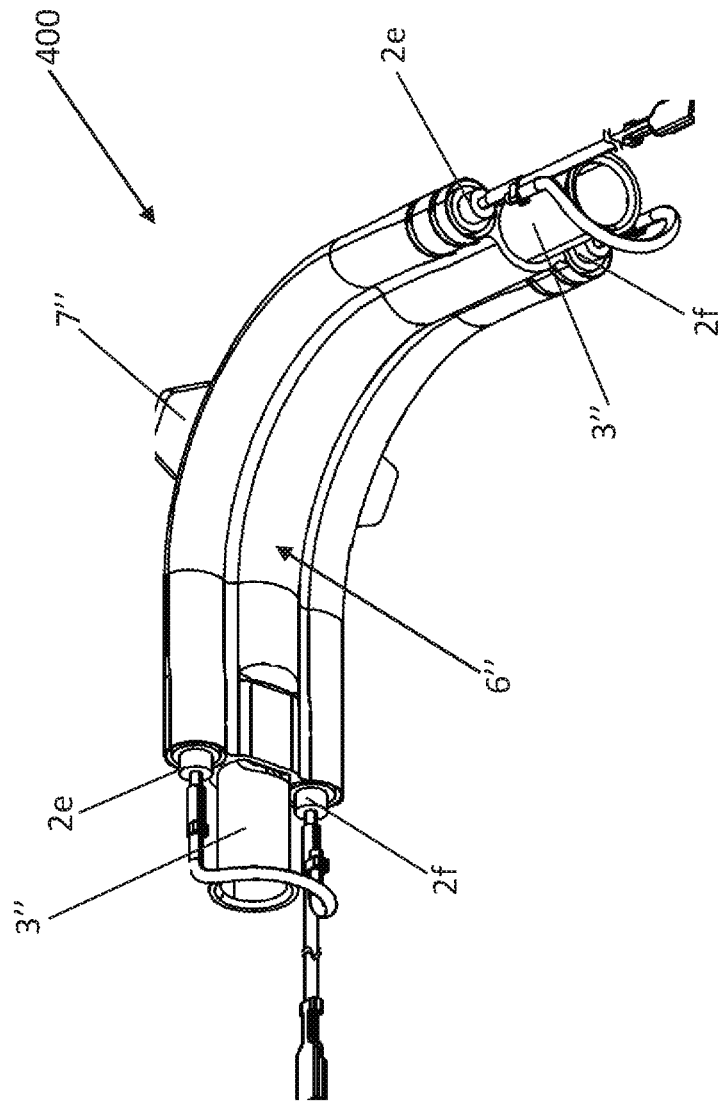
FIG. 6 represents a device for heating a continuous flow fluid according to a further embodiment.

With reference to FIG. 6, an alternative embodiment of both the first and the second embodiments described, is illustrated. The device 400 for heating continuous flow fluids presents both the conduit 3" and the two heating elements 2e, 2f, each provided with two straight end stretches and a curved central stretch that joins the respective two straight end stretch together. The straight stretches are substantially parallel two by two to each other and to the conduit. The two curved stretches are also substantially parallel to each other and to the conduit. This device can have two distinct heating elements 2e, 2f (FIG. 6) that can be joined together at one or two ends thereof, or a single heating element folded back on itself in a similar manner to FIG. 2. For example, the single heating element can be folded back on itself at about half its length, so as to have two substantially parallel and equidistant branches from the conduit for the fluid. The two branches can be connected to one or both of the ends thereof by a respective central portion of the heating element that folds back on itself by turning around one end of the conduit for the fluid. Alternatively, the two heating elements are not joined together. According to this embodiment, slits are also provided that cannot be seen in the drawing, in that they are provided on the other side of the device (it being understood that the slits can also or only be provided on the face that can be seen in the drawing). The slits are as previously described, and in this example also, platforms 7" for thermostats and/or sensors can also be provided. Moreover, the number of slits can be variable, according to the invention, in this embodiment also. For example, at each of the straight and or curved stretches of each of the heating elements, at least one slit, for example two or more slits, can be provided, and at the conduit at least one slit, for example two or more slits, can be provided. The same applies when there is a single heating element with two branches. And again, as for the other embodiments, it is preferable that the slits are provided at a face of the device, for example a lower face, having a greater extension.

It is evident that the use of slits having a cross-section other than semi-circular is not outside the scope of the present invention.

According to the invention, some technical expedients are provided for the construction of the device through the die-casting process:

to obtain a low thermal inertia and a high heating rate, but also to prevent corrosion phenomena, the conduit 3, 3' of the fluid is made of stainless steel, with a very thin wall thickness, preferably less than 1 mm;

the mould used to obtain the device provides for the use of at least one core (not illustrated), preferably two cores, made of steel that serve to prevent deformation of the conduit or to shape the conduit with any shape, as shown FIG. 5. The cores that are inserted into the conduit before injection of aluminium, play a fundamental role in the countering the pressure induced by the forced injection of aluminium and allow the conduit to acquire the desired shape. In addition, the suitably shaped cores allow the shaped areas along any longitudinal position of the conduit. The shape of the conduit is particularly advantageous for checking the volume of the fluid inside the device 300 and thus for keeping heating times under control. Furthermore, a shaped conduit allows for better mixing of the flow rate of the fluid thus ensuring better heating, i.e. better repeatability and homogeneity. This expedient allows stainless steel conduits with very thin walls to be used.

Moreover, in a particularly advantageous manner, the mould for the die-cast production of the devices described in the three preceding embodiments, provides in its interior projections having a substantially semi-circular cross-section (seen in a plane perpendicular to the axis of the conduit when the latter is arranged inside the mould), each of which leave an empty area in the body of the device; in other words, during the die-casting process, the slits or imprints that expose the surface of portions of the conduit and of the at least one heating element, are formed by means of these projections. At the start of casting, the projections serve to hold the conduit and resistor/s still.

It is evident that the use of projections having cross-sections other than semi-circular is not outside the scope of the present invention.

The invention described applies to all those heating systems in which there is a heat exchange between a fluid flowing within a conduit and an electrical resistor.

The invention is in particular applicable where a rapid heating of water is required, especially of a repetitive nature such as for example in machines for the preparation of coffee, and where it is also necessary to rapidly pass to the steam preparation function. It can in general be applied to all machines for the preparation of hot beverages, or in household appliances where the generation of steam is required, however the possibility of applying the present invention in other areas is not excluded.

The invention also provides a process for producing a device as described, wherein the conduit has two open ends and wherein there are provided a mould having the outer shape of the body; at least one metal core having a cross-section substantially equal to the conduit section adapted to be inserted into the conduit; an injection device; and a plurality of projections on the inner surface of the mould, each projection being adapted to shape a respective slit of said plurality of slits, said process comprising the steps of:
arranging said conduit and said sections of the single heating element or of said two heating elements on a respective projection of said plurality of projections, closing the mould,
inserting the at least one metal core into a respective end of the conduit,
filling the mould by means of high-pressure injection of molten metal so that the conduit deforms reproducing the shape of said at least one metal core,
cooling the metal,
extracting said at least one metal core from the conduit,
opening the mould,
extracting the device.

The body of the device is thus produced by filling the mould.

According to one variant, when a device is to be produced with a single heating element folded back on itself so as to have two branches or stretches, at least two projections are provided for each stretch, and an arrangement step of the conduit onto a respective projection, and of each branch of the single heating element onto the respective two projections, is provided.

In another variant, when a device with two distinct heating elements is to be produced, at least two projections for each heating element are provided, and an arrangement step of the conduit onto a respective projection and of each heating element onto the respective two projections, is provided.

According to the process of the invention, including the last two variants just described, at least two projections can also be provided also for the conduit.

The invention claimed is:

1. A device for heating a liquid comprising:
a metal body;
a conduit distinct from the body, for the passage of the liquid to be heated;
a single heating element, distinct from the body and from the conduit, shaped so as to have two longitudinal stretches that longitudinally flank the conduit along two sides, or
two heating elements distinct from the body and from the conduit, that longitudinally flank the conduit along two sides;
wherein the conduit and the single heating element or the two heating elements are incorporated in the body that forms a wall around the conduit and the single heating element or around the conduit and the two heating elements, whereby heat generated by the single heating element or by the two heating elements can be transmitted to the liquid to be heated by means of conduction; and
wherein the body is provided with a plurality of slits or holes, distinct and axially separated from each other, having a depth equal to wall thickness, of which at least two first slits or holes of said plurality of slits or holes are on the conduit and at least two second slits or holes of said plurality of slits or holes are on each longitudinal stretch of the single heating element, or at least two second slits or holes of said plurality of slits or holes are on each heating element of the two heating elements.

2. The device according to claim 1, wherein said at least two first slits or holes leave a surface of the conduit exposed and said at least two second slits or holes leave a surface of the respective longitudinal stretch or of the respective heating element exposed.

3. The device according to claim 1, wherein the two longitudinal stretches or the two heating elements are arranged symmetrically with respect to a longitudinal axis of the conduit.

4. The device according to claim 1, wherein the conduit and the two longitudinal stretches, or the conduit and the two heating elements extend at least partially in parallel to each other.

5. The device according to claim 1, wherein the two longitudinal stretches and the conduit are straight or each have at least one curved stretch, and extend in parallel to each other.

6. The device according to claim 1, wherein the two longitudinal stretches are joined together by a portion of the single heating element, arranged at one end of the conduit.

7. The device according to claim 1, wherein the two heating elements and the conduit are straight or each have at least one curved stretch, and extend in parallel to each other.

8. The device according to claim 7, wherein each of the two heating elements and the conduit are provided with two straight end stretches and with one curved central stretch that joins the respective two straight end stretches together.

9. The device according to claim 1, wherein the body is made of die-cast aluminium or die-cast aluminium alloy.

10. The device according to claim 1, wherein each slit or hole of said plurality of slits or holes is arranged transversely to a longitudinal axis of the conduit.

11. The device according to claim 1, wherein the conduit is made of steel, or alloys thereof, with wall thickness of less than 1 mm.

12. The device according to claim 1, wherein the body is provided with at least one platform that is integral thereto, adapted to fix a thermostat and/or to provide areas for detecting temperature by means of a sensor.

13. A process for producing a device according to claim 1,
wherein the conduit has two open ends, and wherein there are provided a mould having the outer shape of the body; at least one metal core having a cross-section substantially equal to the conduit section, adapted to be inserted into the conduit; an injection device; and a plurality of projections on the inner surface of the mould, each projection being adapted to shape a respective slit or hole of said plurality of slits or holes, said process comprising the steps of:
arranging said conduit and said longitudinal stretches of the single heating element or arranging said conduit and said two heating elements on a respective projection of said plurality of projections;

closing the mould;

inserting the at least one metal core into an end of the conduit;

filling the mould by means of high-pressure injection of molten metal so that the conduit deforms reproducing the shape of said at least one metal core or to prevent deformation of the conduit;

cooling the metal;

extracting said at least one metal core from the conduit;

opening the mould; and extracting the device.

14. The process according to claim 13, wherein the molten metal is aluminium or alloys thereof.

15. Use of a device according to claim 1 in a machine for domestic use, for heating water for beverages.

16. The device according to claim 1, wherein the liquid is water that flows through said device.

\* \* \* \* \*